(12) United States Patent
Ueno et al.

(10) Patent No.: US 10,830,439 B2
(45) Date of Patent: Nov. 10, 2020

(54) JET ENGINE, FLYING OBJECT, AND METHOD OF OPERATING A JET ENGINE

(71) Applicant: MITSUBISHI HEAVY INDUSTRIES, LTD., Tokyo (JP)

(72) Inventors: Yoshihiko Ueno, Tokyo (JP); Shojiro Furuya, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 394 days.

(21) Appl. No.: 15/121,178

(22) PCT Filed: Feb. 17, 2015

(86) PCT No.: PCT/JP2015/054309
§ 371 (c)(1),
(2) Date: Aug. 24, 2016

(87) PCT Pub. No.: WO2015/146376
PCT Pub. Date: Oct. 1, 2015

(65) Prior Publication Data
US 2017/0009992 A1    Jan. 12, 2017

(30) Foreign Application Priority Data

Mar. 28, 2014    (JP) .................................. 2014-070366

(51) Int. Cl.
*F23R 3/00*    (2006.01)
*F23R 3/28*    (2006.01)
(Continued)

(52) U.S. Cl.
CPC .................. *F23R 3/28* (2013.01); *F02K 7/10* (2013.01); *F02K 7/18* (2013.01); *F05D 2220/80* (2013.01);
(Continued)

(58) Field of Classification Search
CPC ..... F23R 3/28; F02K 7/10; F02K 7/18; F02K 7/14; F02K 7/16; F05D 2220/80; F05D 2220/10; F05D 2250/184
See application file for complete search history.

(56) References Cited

U.S. PATENT DOCUMENTS 3,334,485 A * 8/1967 Rhodes ...................... F02K 7/10
60/208
3,430,446 A * 3/1969 McCloy ...................... F02K 7/14
244/1 N
(Continued)

FOREIGN PATENT DOCUMENTS

GB    2 196 393    4/1988
JP    7-91317      4/1995
(Continued)

OTHER PUBLICATIONS

International Preliminary Report on Patentability dated Oct. 4, 2016 in corresponding International Application No. PCT/JP2015/054309.
(Continued)

*Primary Examiner* — Todd E Manahan
*Assistant Examiner* — Edwin Kang
(74) *Attorney, Agent, or Firm* — Wenderoth, Lind & Ponack, L.L.P.

(57) ABSTRACT

A jet engine includes an inlet and a combustor. the inlet takes in air. The combustor combusts fuel with the air. The combustor (12) includes an injector (20) having a plurality of openings (31a, 31b) from which the fuel is injected. The plurality of openings (31a, 31b) are arranged in a direction perpendicular to a direction of a flow path of the air in the combustor (12). The plurality of openings (31a, 31b) include two types of openings different in area.

2 Claims, 10 Drawing Sheets

(51) Int. Cl.
*F02K 7/18* (2006.01)
*F02K 7/10* (2006.01)

(52) U.S. Cl.
CPC .. *F05D 2250/184* (2013.01); *F05D 2250/313* (2013.01); *F05D 2260/99* (2013.01); *F23R 2900/00014* (2013.01); *Y02T 50/671* (2013.01)

(56) References Cited

U.S. PATENT DOCUMENTS

| | | | | |
|---|---|---|---|---|
| 3,667,233 | A | * | 6/1972 | Curran .............. F02K 7/10 60/768 |
| 4,381,642 | A | * | 5/1983 | Giles, Jr. ............ F02K 7/18 60/204 |
| 4,821,512 | A | * | 4/1989 | Guile ................ F02K 7/10 60/39.826 |
| 5,220,787 | A | | 6/1993 | Bulman |
| 5,546,745 | A | * | 8/1996 | Kutschenreuter, Jr. ... F02K 7/14 60/768 |
| 5,941,064 | A | * | 8/1999 | Chevalier .......... F23R 3/20 60/740 |
| 2006/0037322 | A1 | | 2/2006 | Burd et al. |
| 2009/0158705 | A1 | | 6/2009 | Grossi |
| 2012/0031102 | A1 | * | 2/2012 | Uhm ................ F02C 7/222 60/776 |
| 2012/0186264 | A1 | | 7/2012 | Hoke |

FOREIGN PATENT DOCUMENTS

| | | |
|---|---|---|
| JP | 8-219408 | 8/1996 |
| JP | 2005-114347 | 4/2005 |
| JP | 2012-13007 | 1/2012 |
| JP | 2012-144984 | 8/2012 |
| JP | 2012-154617 | 8/2012 |
| JP | 2012-202226 | 10/2012 |
| JP | 2013-60891 | 4/2013 |

OTHER PUBLICATIONS

Extended European Search Report dated Feb. 22, 2017 in corresponding European Application No. 15768566.0.
International Search Report dated May 26, 2015 in corresponding International Application No. PCT/JP2015/054309.

* cited by examiner

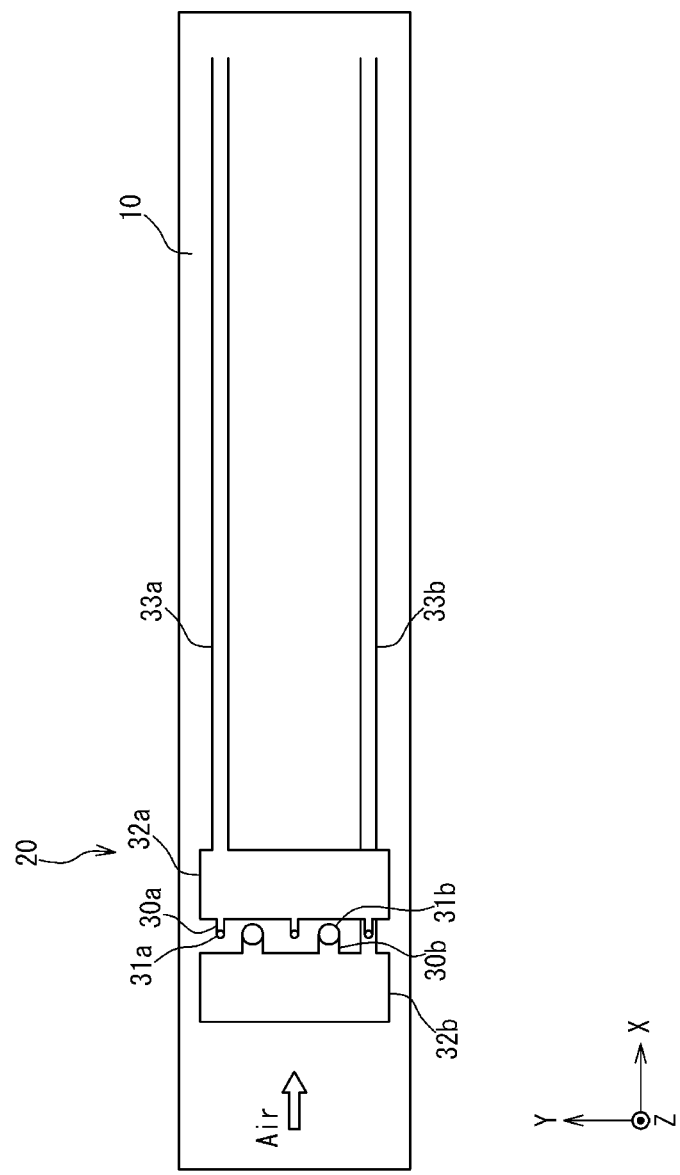

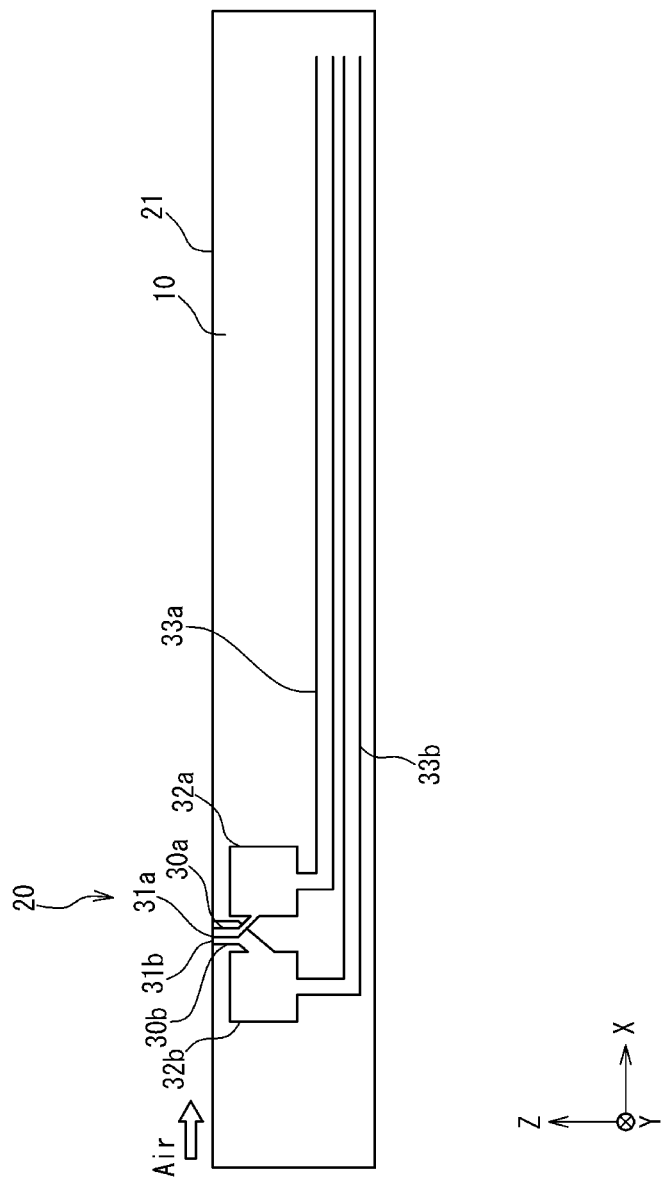

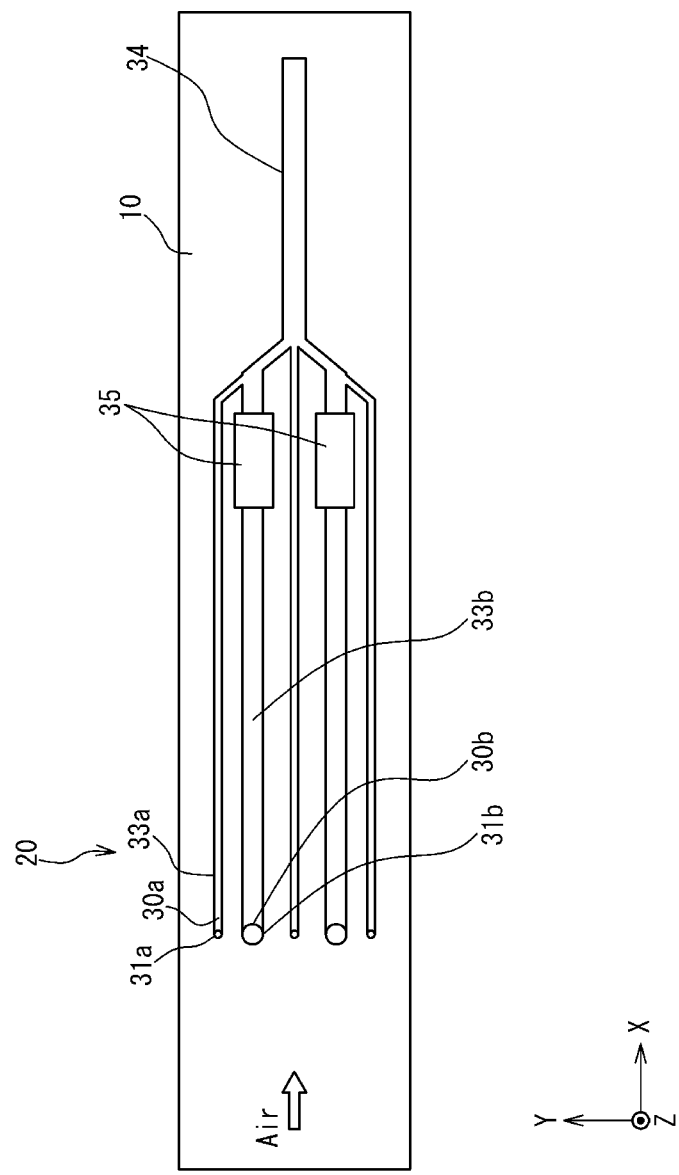

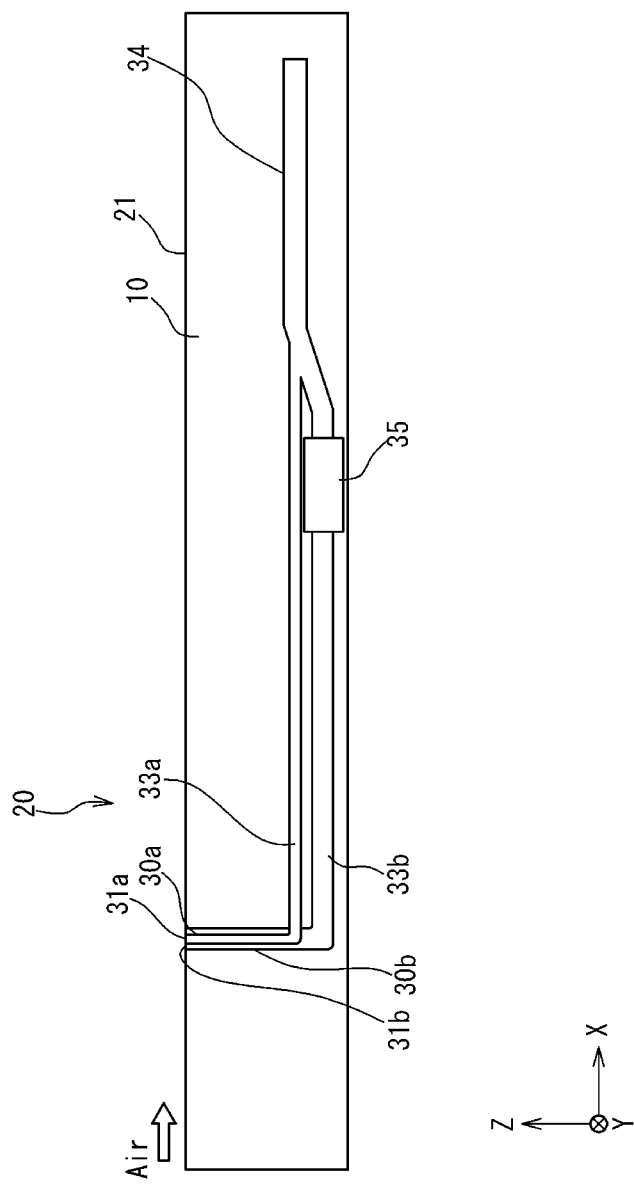

JET ENGINE, FLYING OBJECT, AND METHOD OF OPERATING A JET ENGINE

TECHNICAL FIELD

The present invention relates to a jet engine, a flying object, and a method of operating a jet engine.

BACKGROUND ART

As jet engines for a fuselage which flies faster than the velocity of sound, a ram jet engine and a scram jet engine are known. These engines are types of jet engine which takes in air to operate, and especially, in the ram jet engine or the scram jet engine, because a flow of the air taken-in is extremely high speed, it is required that the fuel and the air are mixed and combusted in a short time.

FIG. 1 is a sectional view schematically showing the structure of a jet engine. The jet engine 102 has a fuselage 110 and a cowl 140 provided below the fuselage 110 to form a space 150 through which gas is possible to flow. A front lower part of the fuselage 110 and a front part of the cowl 140 configure an inlet 111 which introduces air into the space 150. The middle lower part of the fuselage 110 and the middle part of the cowl 140 configure a combustor 112 that mixes and combusts fuel and air. The rear lower part of the fuselage 110 and the rear part of the cowl 140 configure a nozzle 113 which expands and emits a combustion gas. The combustor 112 has a fuel injector 120. The fuel injector 120 is provided on a wall surface 121 in the lower part of the fuselage 110 corresponding to the combustor 112. Moreover, a flame stabilizer may be provided on the wall surface 121 behind the fuel injector 120 (not shown). The fuel injector 120 injects fuel G for the space 150. The jet engine 102 mixes the air taken in from the inlet 111 and the fuel G injected from the fuel injector 120 and combusts the mixture in the combustor 112. The jet engine 102 expands the combustion gas in the nozzle 113 and emits it backwardly from the fuselage 110. About the flame stabilization in the combustor 112, a part of the fuel G is supplied and diffused toward a low-speed region which exists in the boundary layer developed on the wall surface 121 of the combustor 112, and the flame stabilization is carried out. When the flame stabilizer exists, a part of the fuel G is supplied and diffused toward the low-speed region which exists around the flame stabilizer arranged on the wall surface 121 of the combustor 112 to carry out the flame stabilization.

A supersonic combustor is disclosed in Patent Literature 1 (JP H08-219408A) as a related art. The supersonic combustor has a strut of a wedge-shaped cross-section, a plurality of fragments and an injection nozzle. The strut of the wedge-shaped cross-section is arranged to direct the acute-angled section to the upper stream in the flow path of the supersonic air flow and has a rear end surface almost orthogonal to the flow path. The plurality of fragments are provided for the rear end surface of the strut to have almost a same width as the rear end surface and to extend to the side of a lower stream. The injection nozzle is provided between the fragments of the strut to inject the fuel for the lower stream.

CITATION LIST

[Patent Literature 1] JP_H08-219408A

SUMMARY OF THE INVENTION

A subject matter of the present invention is to provide to a jet engine which can operate more stably and relax a limitation of a use speed range and so on, a flying object, and a method of operating a jet engine. Also, another optional and additional subject matter of the present invention is to provide a jet engine in which fuel consumption can be reduced by promoting the mixing of the fuel and the air, a flying object, and a method of operating the jet engine.

A jet engine according to some embodiments includes an inlet configured to take in air, and a combustor configured to combust fuel with the air. The combustor includes an injector having a plurality of openings from which the fuel is injected. The plurality of openings are arranged in a direction perpendicular to a direction of a flow path of the air in the combustor. The plurality of openings include two types of openings having different areas. Note that in this Specification, the word "perpendicular" includes "almost perpendicular". The concept of "almost perpendicular" includes a range of ±5° to a perpendicular line (namely, a range from 85° to 95°).

A jet engine according to some embodiments includes an inlet configured to take in air; and a combustor configured to combusts fuel by using the air. The combustor includes an injector having openings from which the fuel is injected. The openings extend in a direction perpendicular to a flow direction of the air in the combustor and widths of the openings in the flow direction are changed along the perpendicular direction. Note that in this Specification, the word "perpendicular" includes "almost perpendicular". The concept of "almost perpendicular" includes a range of ±5° to a perpendicular line (namely, a range from 85° to 95°).

The method of operating the jet engine according to some embodiments, wherein the jet engine includes an inlet configured to take in air; and a combustor configured to combust fuel with the air. The combustor includes an injector having a plurality of openings from which the fuel is injected. The plurality of openings are arranged in a direction perpendicular to a direction of a flow path of the air in the combustor, and comprises two types of openings different in area. The method of operating a jet engine includes: supplying the fuel to the plurality of openings; injecting the fuel from the plurality of openings; and combusting the fuel injected from the plurality of openings with the air.

According to the present invention, a jet engine which can operate more stably and relax a limitation of a use speed range and so on, a flying object, and a method of operating a jet engine are provided. Also, optionally and additionally, according to the present invention, a jet engine in which fuel consumption can be reduced by promoting the mixing of the fuel and the air, a flying object, and a method of operating the jet engine are provided.

BRIEF DESCRIPTION OF THE DRAWINGS

The attached drawings are incorporated into this Specification to help the description of embodiments. Note that the drawings should not be interpreted to limit the present invention to illustrated examples and described examples.

FIG. 7A is a plan view schematically showing an example of the configuration of a fuel injector according to the first embodiment.

FIG. 7B is a side view schematically showing an example of the structure of the fuel injector according to the first embodiment.

FIG. 8A is a plan view schematically showing another example of the configuration of the fuel injector according to the first embodiment.

FIG. 8B is a side view schematically showing another example of the configuration of the fuel injector according to a first embodiment.

DESCRIPTION OF THE EMBODIMENTS

Hereinafter, a jet engine and a method of operating a jet engine according to embodiments will be described with reference to the attached drawings. In this case, an example in which the jet engine is applied to a flying object will be described. In the following detailed description, many detailed specific items will be disclosed for the purpose of description in order to provide the comprehensive understanding of the embodiments. However, it would be apparent that one or plural embodiments are executable without these detailed specific items.

(Items Recognized by the Inventors)

Figure 1:
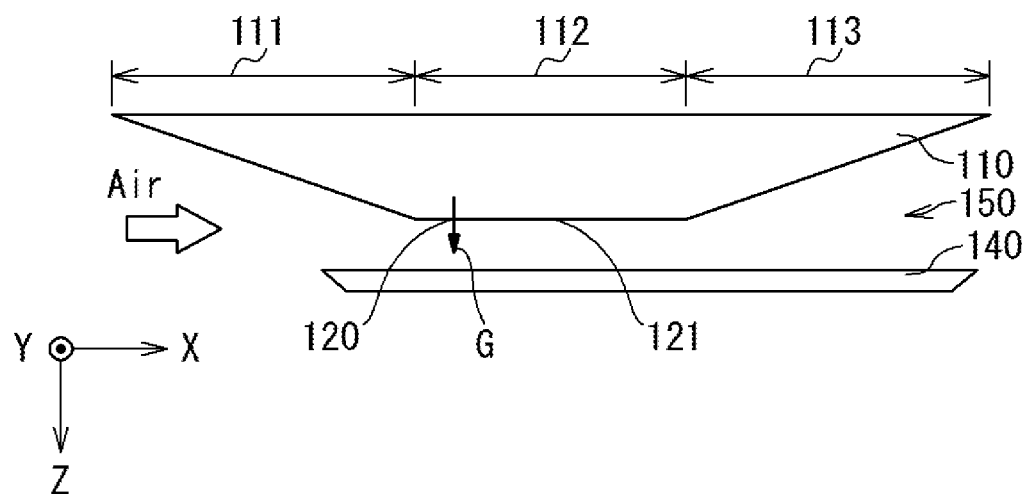
FIG. 1 is a sectional view schematically showing a configuration of a jet engine.

In FIG. 1, when being injected from the fuel injector 120 to a perpendicular direction (+Z direction), fuel G diffuses in the flow direction of air Air (+X direction) while diffusing in the perpendicular direction (+Z direction). Here, a diffusion distance of the fuel G into the perpendicular direction (+Z direction) is defined as "a penetration height" of the fuel G. The penetration height of the fuel G is mainly determined based on a ratio of the momentum of the air Air in the flow direction (+X direction) and the momentum of the injected fuel G in the perpendicular direction (+Z direction).

Figure 2A:
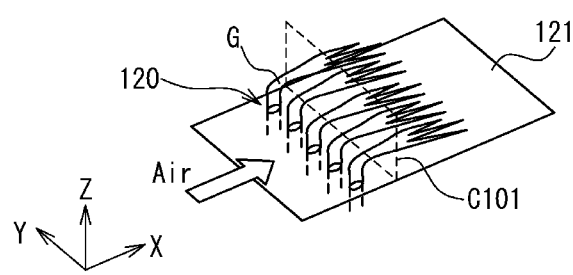
FIG. 2A is a diagram schematically showing the state of a fuel injection.
Figure 2B:
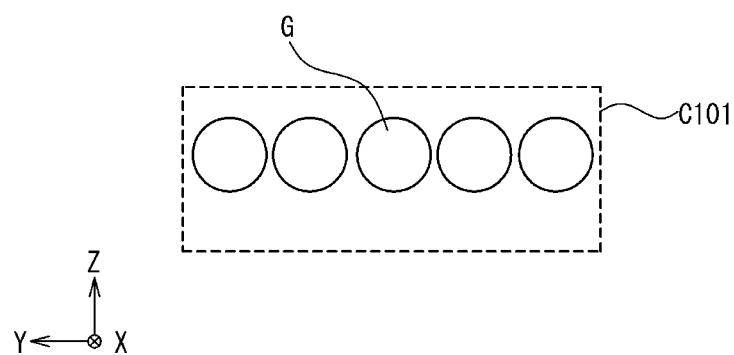
FIG. 2B is a diagram schematically showing the state of the fuel injection.

As a method of promoting the mixing of fuel and air in a short time, a method of eliminating a uneven distribution of fuel could be considered in which a plurality of fuel injection ports are arranged in a span direction (+Y direction) in the combustor. FIG. 2A and FIG. 2B are diagrams schematically showing the state of the fuel injection. However, FIG. 2A is a perspective view of a neighborhood of the plurality of fuel injection ports of the fuel injector 120. FIG. 2B is a diagram showing the state of fuel G in a section C101 of FIG. 2A. Also, the section C101 is an YZ section in the position apart by a predetermined distance in the flow direction (+X direction) from the fuel injector 120 in the flow paths of air Air and fuel G. In these diagrams, components are illustrated to turn the components upside down, inversely to FIG. 1.

As shown in FIG. 2A, the fuel G is supplied to a perpendicular direction (+Z direction) from the plurality of fuel injection ports of the fuel injector 120 which is provided for the wall surface 121 of the combustor 112. After that, the fuel G is drifted to a flow direction (+X direction) of the air Air taken-in from the inlet 111. At that time, as shown in FIG. 2B, because the fuel G is diffused adequately into the span direction (Y direction) in the section C101 (YZ section), there is little uneven distribution of the fuel G. However, because the fuel G diffuses on the up side in a height direction (Z direction), the uneven distribution of the fuel G exists.

When the uneven distribution of the fuel G in the height direction (Z direction) exists as shown in FIG. 2B, the mixing of the air and the fuel G becomes insufficient depending on the speed of the flying object 1 so that the situation that the stable combustion becomes difficult can be sometimes caused. In such a case, it could be considered that the operation of the engine becomes unstable. Therefore, when a jet engine is used, it is necessary to restrict a use speed range and so on to a predetermined range.

First Embodiment

The configuration of the flying object 1 according to the present embodiment will be described.

Figure 3:
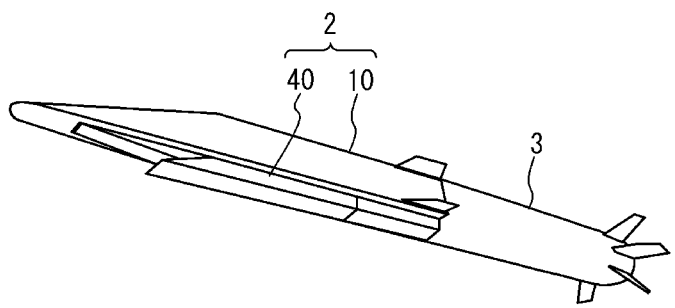
FIG. 3 is a perspective view showing a structural example of a flying object according to an embodiment.

FIG. 3 is a perspective view showing a structural example of a flying object 1 according to the present embodiment. The flying object 1 includes a jet engine 2 and a rocket motor 3. When the flying object 1 is launched from a launcher, the rocket motor 3 accelerates the flying object 1 from a speed at the time of flight start to a desired speed. However, the speed at the time of flight start is the speed of zero, when the flying object 1 is launched from a stationary launcher. On the other hand, the speed at the time of flight start is a traveling speed (or a flight speed) of a moving vehicle (or a flight body), when the flying object is launched from the launcher of a moving vehicle on the traveling (or the flight body being flying). The jet engine 2 further accelerates the flying object 1 to fly for the target after the flying object 1 disconnects the rocket motor 3. The jet engine 2 has a fuselage 10 and a cowl 40. The fuselage 10 and the cowl 40 configure an inlet, combustor and nozzle of the jet engine 2, to be mentioned later. The jet engine 2 introduces air from a front part of the inlet, and mixes the air and fuel and combusts the mixture in the combustor, and expands the combustion gas in the nozzle to send out. Thus, the jet engine 2 acquires thrust force.

Next, the jet engine according to the present embodiment will be described.

Figure 4:
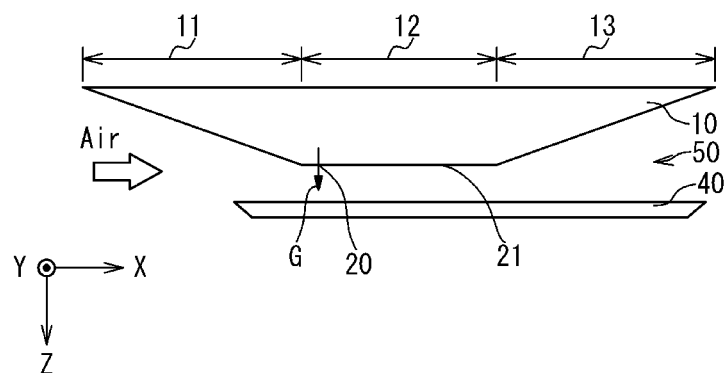
FIG. 4 is a sectional view schematically showing a structural example of the jet engine according to the embodiment.

FIG. 4 is a sectional view schematically showing a structural example of the jet engine according to the present embodiment. The jet engine 2 has the fuselage 10 and the cowl 40 provided to form a space 50 below the fuselage 10, and gas can flow through the space 50. The front lower part of the fuselage 10 and the front part of the cowl 40 configure the inlet 11 which introduces the air into the space 50. The middle lower part of the fuselage 10 and the middle part of the cowl 40 configure the combustor 12 in which the fuel and the air are mixed and combusted. The rear lower part of the fuselage 10 and the rear part of the cowl 40 configure the nozzle 13 in which the combustion gas is expanded and sent out. The combustor 12 has a fuel injector 20.

The fuel injector 20 is provided for a wall surface 21 in the lower part of the fuselage 10 corresponding to the combustor 12. The fuel injector 20 injects the fuel G stored in the fuselage 10 for the space 50 in an almost perpendicular direction (+Z direction). The injected fuel G is mixed with the air taken-in from the inlet 11 and combusted. Also, in an initial stage of the combustion, the fuel G is ignited by an igniter (not illustrated) and so on. The fuel injector 20 has a plurality of fuel injection ports provided for a lower part of the fuselage 10 and arranged in the span direction. The shape, number and positions of the fuel injection ports are optional.

Note that the combustor 12 may have a flame stabilizer on the wall surface 21 behind the fuel injector 20 (not illustrated).

Figure 5A:
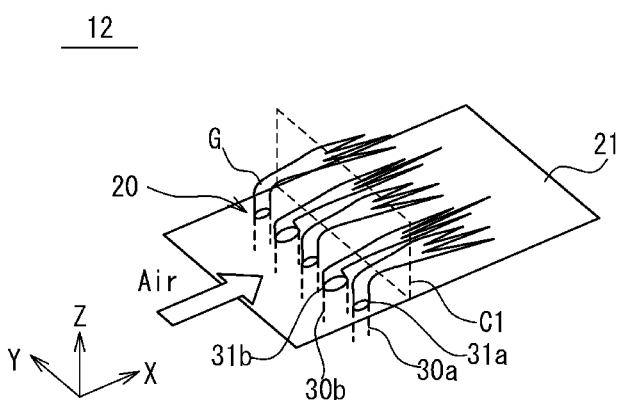
FIG. 5A is a diagram schematically showing the state of fuel injection of a combustor according to a first embodiment.
Figure 5B:
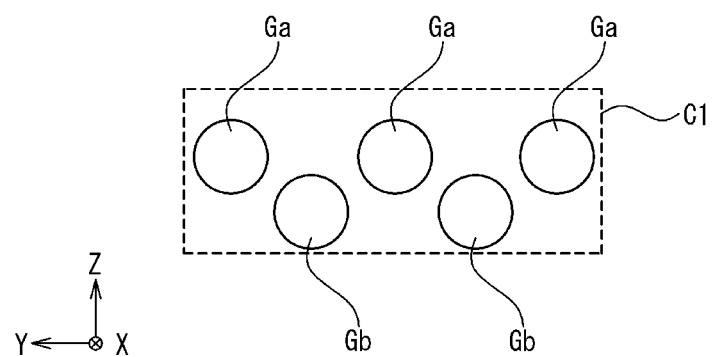
FIG. 5B is a diagram schematically showing the state of the fuel injection of the combustor according to a first embodiment.

FIG. 5A to FIG. 5B are diagrams schematically showing the state of the fuel injection in the combustor according to the present embodiment. However, FIG. 5A is a perspective view showing the neighborhood of the fuel injection ports of the fuel injector 20. FIG. 5B is a diagram showing the state of the fuel G in the section C1 of FIG. 5A. Also, the section C1 is an YZ section in the position apart by a predetermined distance in the flow direction (+X direction) from the fuel injector 20 of the flow paths of air Air and fuel G. In these diagrams, components are illustrated to turn the components upside down, inversely to FIG. 4.

As shown in FIG. 5A, the combustor 12 has the fuel injector 20 provided on the wall surface 21 of the combustor 12. The fuel injector 20 injects the fuel G from the wall surface 21 of the combustor 12 for the space 50 in an almost perpendicular direction (+Z direction). The fuel injector 20 has a plurality of fuel injection ports 31a, a plurality of fuel supply pipes 30a, a plurality of fuel injection ports 31b and a plurality of fuel supply pipes 30b.

The fuel supply pipe 30a is a pipe which supplies the fuel G to the fuel injection port 31a from a tank (not illustrated). The fuel injection port 31a is an opening which is provided on the wall surface 21 and injects the supplied fuel G to the space 50. On the other hand, the fuel supply pipe 30b is a pipe which sends the fuel G to the fuel injection port 31b from the tank (not illustrated). The fuel injection port 31b is an opening provided on the wall surface 21 and injecting the supplied fuel G to the space 50. The shapes of the openings of the fuel injection port 31a and the fuel injection port 31b are optional and may be circular, elliptical, polygonal and a combination of them. For example, the fuel supply pipe 30a and the fuel supply pipe 30b supply the fuel G to the fuel injection port 31a and the fuel injection port 31b in almost the same flow rate, respectively. For example, the fuel injection port 31a and the fuel injection port 31b inject the fuel G toward the space 50 in almost the same flow rate.

The fuel injection ports 31a and the fuel injection ports 31b are alternately arranged in a direction orthogonal to the flow path of air which flows through the combustor 12 (desirably, the direction almost perpendicular to the direction of the air flow path). Specifically, the fuel injection port 31a and the fuel injection port 31b are arranged in an array in the span direction (Y direction). Note that in this Specification, the span direction includes almost the same direction as the span direction. Also, in this Specification, the direction of the air flow path means a longitudinal direction of the combustor (specifically, X direction which heads for the side of the lower stream from the side of the upper stream in the flow of mainstream air).

In an example shown in FIG. 5A, the cross section of the opening of the fuel injection port 31a is smaller than the cross section of the opening of the fuel injection port 31b. That is, in the example shown in FIG. 5A, the fuel injection port 31a having the opening of a small sectional area and the fuel injection port 31b having the opening of a large sectional area, are alternately arranged in an array in the span direction (Y direction). In other words, the plurality of fuel injection ports having different areas in the opening are arranged in an array in the span direction (Y direction). Or, it is possible to say that adjacent two of the plurality of fuel injection ports are different from each other in the opening area (it is possible to say that one of the plurality of fuel injection ports 31a and one of the plurality of fuel injection ports 31b are different in the opening area. In an example shown in FIG. 5A, the shapes of the openings of the fuel injection port 31a and the fuel injection port 31b are circular. In this case, the fuel injection port 31a with a small hole diameter and the fuel injection port 31b with a large hole diameter are alternately arranged in an array in the span direction (Y direction).

The fuel G supplied from the plurality of fuel injection ports 31a is supposed to be the fuel Ga, and the fuel G supplied from the plurality of fuel injection ports 31b is supposed to be the fuel Gb. The fuel Ga is supplied to the direction (+Z direction) almost perpendicular to the plurality of fuel injection ports 31a and is drifted to the air flow direction (+X direction) by air Air from the inlet 11. At that time, as shown in FIG. 5B, the fuel diffuses into a relatively high region (region having larger Z, namely, the region having a relatively large distance from the wall surface where the fuel injection port 31a is arranged) in the almost perpendicular direction (+Z direction) in the section C1 (YZ section). On the other hand, the fuel Gb is supplied to the direction (+Z direction) almost perpendicular to the plurality of fuel injection ports 31b and is drifted to the flow direction (+X direction) with air Air taken in from the inlet 11. At that time, as shown in FIG. 5B, the fuel Gb diffuses into a relatively low region (a region having a small Z, namely, a region having a relatively small distance from the wall surface on which the fuel injection ports 31b are arranged) in the almost perpendicular direction (Z direction) in the section C1 (YZ section). That is, the fuel G diffuses adequately in the almost perpendicular direction (+Z direction), like the fuel Ga and the fuel Gb, and the uneven distribution of the fuel G can be made little. Note that the fact that the fuel G diffuses adequately in the span direction (the Y direction), so that there is little uneven distribution is same as in case of FIG. 2A and FIG. 2B.

In this way, the reason why the uneven distribution of the fuel G eliminates by alternately arranging the fuel injection ports 31a with a small hole diameter and the fuel injection ports 31b with a large hole diameter will be described.

Figure 6:
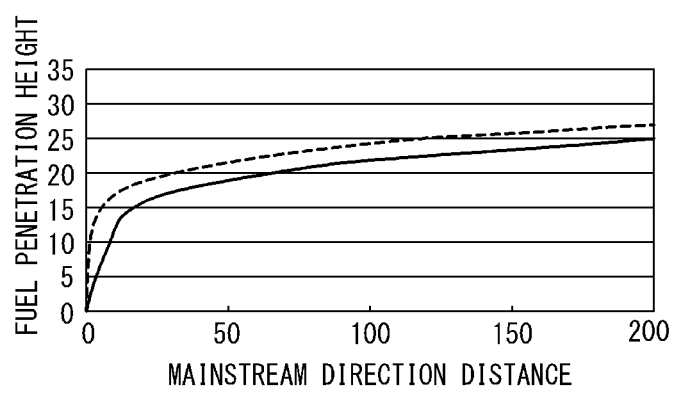
FIG. 6 is a graph showing a relation of a penetration height of the fuel and a distance drifted by the air.

FIG. 6 is a graph showing a relation of the penetration height of the fuel G and the drift distance by the air Air. The vertical axis shows the penetration height (+Z direction; in an optional unit) of the fuel G, and the horizontal axis shows the distance (+X direction; in an optional unit) of the fuel G to be drifted by the air Air. The origins (0) of the horizontal axis and the vertical axis are the position of the fuel injector 20. The broken line shows a case that the area of the opening of the fuel injection port is small (the hole diameter is small). The solid line shows a case that the area of the opening of the fuel injection port is large (the hole diameter is large). However, the flow rate of the injected fuel G is identical regardless of the area of the opening of the fuel injection port.

The penetration height showing diffusion in the almost perpendicular direction (+Z direction) of the fuel G injected from the fuel injector is mainly determined based on a ratio of the momentum of the air Air in the flow direction for every unit time (hereinafter, to be referred to as momentum) and the momentum of the injected fuel G in the almost perpendicular direction. When the fuel G of an identical flow rate is injected, the momentum of the fuel G becomes relatively high as the area of the opening of the fuel injection port (ex. a hole diameter) becomes small. As a result, the penetration height tends to become relatively high (the broken line). On the other hand, the momentum of the fuel G becomes relatively low as the area of the opening of the fuel injection port (ex. the hole diameter) becomes large. As a result, the penetration height tends to become relatively low (the solid line). Therefore, by arranging the plurality of fuel injection ports having different areas of the openings, the fuel injection of the different penetration height can be realized as shown in FIG. 5B. Thus, the effective diffusion and mixing of the fuel G can be realized to the almost perpendicular direction (+Z direction).

The reason why the momentum changes is as follows. That is, it is supposed that the area of the opening of the fuel injection port (ex. the hole diameter) is above a predetermined value, and the flow speed of the fuel G in case of injection is below the velocity of sound. In this case, the flow speed of the fuel in case of injection of the fuel in the identical flow rate becomes relatively fast, as the area of the opening of the fuel injection port (ex. the hole diameter) becomes small. Thus, the momentum increases relatively. Oppositely, the flow speed of the fuel G in case of injection of the fuel in an identical flow rate becomes relatively slow as the area of the opening of the fuel injection port (ex. the hole diameter) becomes large. Thus, the momentum decreases relatively.

On the other hand, it is supposed that the area of the opening of the fuel injection port (ex. the hole diameter) is below the predetermined value and the slow speed of the fuel G in case of injection reaches the velocity of sound. In this case, the flow speed of the fuel G in case of injection becomes same as the velocity of sound, regardless of the size of the area of the opening of the fuel injection port (ex. the hole diameter). However, the supply pressure of the fuel G in case of injection of the fuel in an identical flow rate becomes relatively high as the area of the opening of the fuel injection port (ex. the hole diameter) becomes small. Thus, the momentum increases relatively in consideration of increase of the energy due to the pressure. Oppositely, the supply pressure of the fuel G in case of injection of the fuel in the identical flow rate becomes relatively low, as the area of the opening of the fuel injection port (ex. the hole diameter) becomes large. Thus, the momentum decreases relatively in consideration of decrease of the energy due to the pressure.

FIG. 7A and FIG. 7B are a plan view and a side view schematically showing an example of the structure of the fuel injector according to the present embodiment. These are diagrams when the inside of the fuselage 10 is seen through. The fuel injector 20 has a manifold 32a, a pipe 33a, a manifold 32b and a pipe 33b, in addition to the plurality of fuel injection ports 31a, the plurality of fuel supply pipes 30a, the plurality of fuel injection ports 31b and the plurality of fuel supply pipes 30b. The pipe 33a connects a fuel tank (not illustrated) and the manifold 32a through a valve (not illustrated) and so on. The manifold 32a is a fuel container provided between the pipe 33a and the plurality of fuel supply pipes 30a. The manifold 32a distributes the fuel supplied through the pipe 33a to the plurality of fuel supply pipes 30a. In the same way, the pipe 33b connects a fuel tank (not illustrated) and the manifold 32b through a valve (not illustrated) and so on. The manifold 32b is a fuel container provided between the pipe 33b and the plurality of fuel supply pipes 30b. The manifold 32b distributes the fuel supplied through the pipe 33b to the plurality of fuel supply pipes 30b.

Here, the fuel G is subjected to a flow rate adjustment by the valve and so on, and is distributed to the pipe 33a and the pipe 33b, for example, in the identical flow rate, and is supplied to the manifold 32a and the manifold 32b. The fuel G is injected in, for example, the identical flow rate from the plurality of fuel injection ports 31a and 31b through the plurality of fuel supply pipes 30a and 30b. Therefore, the flow rate of the fuel supplied to one of the plurality of fuel injection ports 31a and the flow rate of the fuel supplied to one of the plurality of fuel injection ports 31b is identical to each other. Note that in this Specification, the identical flow rate includes a case of an almost identical flow rate.

At this time, inside the manifold 32a, the flow speed and pressure of the fuel is equalized. Accordingly, the fuel with identical flow rate is supplied to the plurality of fuel supply pipes a. That is, the manifold 32a plays a role of bundling a fuel supply system in the upper stream than the fuel supply pipe 30a to the pipe 33a, in addition to suppressing the time change of the flow rate.

Because the fuel injector 20 has such a structure, it is not necessary to use the same number of pipes as the number of openings so that a combination of the pipes, and the whole fuel supply system can be made simple, even when the fuel is supplied to the plurality of fuel injection ports different in area.

FIG. 8A and FIG. 8B are a plan view and a side view schematically showing another example of the structure of the fuel injector according to the present embodiment. These are diagrams when the inside of the fuselage 10 is seen through. The fuel injector 20 has the plurality of pipes 33a and a plurality of decompression mechanisms 35 and the plurality of pipes 33b, in addition to the plurality of fuel injection ports 31a, the plurality of fuel supply pipes 30a, the plurality of fuel injection ports 31b and the plurality of fuel supply pipes 30b. The pipe 33a is provided every fuel supply pipe 30a and connects a common pipe (a main fuel pipe) 34 from the tank (not illustrated) and the fuel supply pipe 30a. The fuel G supplied through the common pipe 34 is supplied to the fuel supply pipe 30a through the pipe 33a. On the other hand, the pipe 33b is provided every fuel supply pipe 30b, and connects the common pipe 34 from the tank (not illustrated) and the fuel supply pipe 30b. The decompression mechanism 35 is a unit decompressing the fuel G (ex. orifice) provided on the way of the pipe 33b for every pipe 33b. The fuel G supplied through the common pipe 34 is supplied to the fuel supply pipe 30b through the pipe 33b while decompressed by the decompression mechanism 35.

Here, the pipe 33a is a pipe with a relatively thin inner diameter. On the other hand, the pipe 33b is a pipe with a relatively thick inner diameter and contains the decompression mechanism 35 on the way (the passage is narrowed). Therefore, the fuel G from the common pipe 34 is distributed to the plurality of pipes 33a and the plurality of pipes 33b in the identical flow rate without adjusting the flow rate by the valve and so on. The fuel G is injected in the identical flow rate from the plurality of fuel injection ports 31a and 31b through the plurality of fuel supply pipes 30a and 30b.

At this time, because the pressure is relatively high in the pipe 33a and the fuel supply pipe 30a, the fuel G is injected at a relatively high speed when the area of the opening of the fuel injection port is above a predetermined value and the flow speed in case of injection is below the velocity of sound. The fuel G is injected at a relatively high pressure when the area of the opening of the fuel injection port is below the predetermined value and the flow speed in case of injection is the velocity of sound. On the other hand, because the pressure is relatively low in the pipe 33b and the fuel supply pipe 30b by the decompression mechanism 35, the fuel G is injected at a relatively low speed when the area of the opening of the fuel injection port is above the predetermined value and the flow speed in case of injection is below the velocity of sound, and the fuel G is injected in a relatively low pressure when the area of the opening of the fuel injection port is below the predetermined value and the flow speed in case of injection is the velocity of sound.

Next, the flying object 1 and a method of operating the jet engine 2 according to the embodiment will be described.

The flying object 1 is launched for a target from a setting position, and the rocket motor 3 accelerates to a desired speed, time, distance or altitude from a speed in the flight start. After that, the flying object 1 disconnects the rocket motor 3 and is accelerated with the jet engine 2.

When the flying object 1 flies by the jet engine 2, the fuel G is supplied to the plurality of fuel injection ports 31a and 31b of the fuel injector 20 in an almost identical flow rate.

At this time, the pressure of the fuel G injected from the fuel injection port 31a of the fuel injector 20 becomes relatively high. Therefore, the fuel G is injected at a relatively high speed, when the area of the opening of the fuel injection port is above the predetermined value and the flow speed in case of injection is below the velocity of sound, and the fuel G is injected at a relatively high pressure, when the area of the opening of the fuel injection port is below the predetermined value and the flow speed in case of injection is the velocity of sound. That is, the fuel G having a relatively high momentum is injected. Thus, because the penetration height of the fuel G becomes high, the fuel G is mainly supplied to an upper part of the flow path (the upper side of the section C1 in FIG. 5B: the fuel Ga).

On the other hand, the pressure of the fuel G injected from the fuel injection port 31b of the fuel injector 20 becomes relatively low. Therefore, the fuel G is injected at a relatively low speed, when the area of the opening of the fuel injection port is above the predetermined value and the flow speed in case of injection is below the velocity of sound, and the fuel G is injected at a relatively low pressure, when the area of the opening of the fuel injection port is below the predetermined value and the flow speed in case of injection is the velocity of sound. That is, the fuel G having a relatively low momentum is injected. Thus, because the penetration height of the fuel G becomes low, the fuel G is mainly supplied to a lower part of the flow path (the lower side of the section C1 in FIG. 5B: the fuel Gb).

In this way, the flying object 1 can inject the fuel G continuously in the condition that the uneven distribution of the fuel G is very little (FIG. 5B). The flying object 1 flies at an almost predetermined speed.

As mentioned above, the flying object 1 and the jet engine 2 according to the embodiment operate.

Note that the plurality of fuel injection ports may be arranged while varying the area of the port in the span direction (the Y direction), regardless of a combination of the ports of the large area and the ports of the small area without limiting to an example of FIG. 5A (small (S), large (L), S, L, S). For example, a combination of (L, S, L, S, L), a combination of (S, S, L, S, S, L, S, S), a combination of (S, middle (M), L, M, S, M, L, M, S), and so on are allowed.

In the present embodiment, the plurality of fuel injection ports having openings different in area are arranged in the span direction (the Y direction). Therefore, the fuel supplied to each fuel injection port in the identical flow rate is injected from each fuel injection port. Then, the injected fuel diffuses into the flow path in the penetration height according to the area of the opening of each fuel injection port (the momentum of the fuel). That is, the fuel is injected in a plurality of different penetration heights. Therefore, because the uneven distribution of the fuel in the flow path can be eliminated as a whole, it is possible to promote the efficient mixing of the fuel and the air in the flow path. Thus, it is possible to improve the thrust force and fuel consumption of the jet engine. Also, because the mixing of the fuel and the air which flows through the flow path can be promoted, the distance which is required to mix the fuel and the air can be reduced. Thus, the small sizing of the jet engine becomes possible.

Also, in the present embodiment, the plurality of fuel injection ports having the openings different in area are arranged in the span direction so as to promote the mixing of the fuel and the air. In this case, it is not necessary to add a special device and so on. Therefore, there is no case that the fuselage is made large-sized. That is, without making the fuselage large-sized, the performance of the jet engine can be improved.

Also, in the present embodiment, because the areas of the openings of the neighbor fuel injection ports differ, the shear force is generated between the injection flows of the fuel from these ports. As a result, the injection flows of the fuel of these ports are disturbed so that it becomes possible to promote the mixing with the air.

Also, in the present embodiment, because the mixing of the fuel and the air is further promoted, a stable combustion range can be extended to a lower speed region, and the fuel consumption can be reduced. That is, the jet engine can be used in a high efficiency from the lower speed. Thus, the fuel to be loaded in the flying object 1 can be reduced and the use speed range of the rocket motor 3 by the flying object 1 and the thrust force by the rocket engine can be made small. That is, the fuel tank and the rocket motor 3 can be made small sized and the size and weight of the flying object 1 can be reduced greatly.

Second Embodiment

A second embodiment differs from the first embodiment in that the openings of the fuel injection ports are continuously arranged to the span direction. Below, the point of difference will be mainly described in detail.

Figure 9:
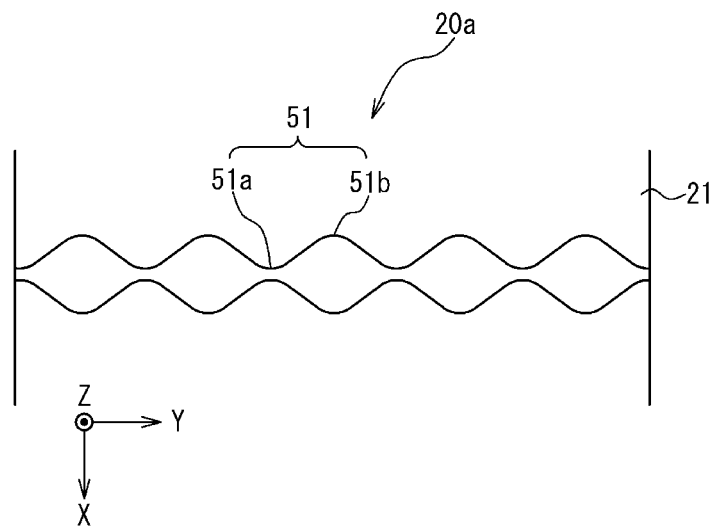
FIG. 9 is a plan view schematically showing a structural example of the fuel injector of the combustor according to a second embodiment.

FIG. 9 is a plan view schematically showing a structural example of the fuel injector of the combustor according to the present embodiment. In the present embodiment, the combustor 12 has a fuel injector 20a. The fuel injector 20a has a fuel injection port 51 as an opening from which the fuel is injected. The fuel injection port 51 extends a second direction (Y direction) almost perpendicular to a first direction of an air flow path (X direction), and the width in the first direction (X direction) changes along the second direction (Y direction). In an example of FIG. 9, the fuel injection port 51 has an opening 51a with a narrow width in the first direction and an opening with a wide width in the first direction. The change of the width in the first direction (X direction) is wavy (or sign-curved). In this case, the supply of the fuel may be carried out with one fuel supply pipe or a plurality of fuel supply pipes.

In the first embodiment, the fuel injection port 31a with a small area and the fuel injection port 31b with a large area exist independently, and are alternately arranged in the span direction (Y direction). On the other hand, in the present embodiment, the fuel injection ports different in area do not exist independently but the fuel injection ports are coupled and unified in the span direction (Y direction). However, the coupling may be broken off partially.

At this time, when the local area of the opening of the fuel injection port is larger than a predetermined value and a flow speed at the injection of the fuel G is below the velocity of sound, the flow speed in case of injection of the fuel G becomes relatively fast, because the area of an opening 51a with a narrower width of the fuel injection ports 51 is small. Thus, the momentum increases relatively and the penetration height becomes high. Oppositely, because the area of the opening 51b with a wider width of the fuel injection port 51 is large, the flow speed in case of injection of the fuel G becomes slow. Thus, the momentum decreases relatively and the penetration height becomes low. Therefore, in this case, a plurality of fuel injections with different penetration heights from the openings can be realized. Thus, the effective mixing of the fuel G in the almost perpendicular direction (+Z direction) can be realized.

The other configuration and operation are same as in the first embodiment.

Figure 10:
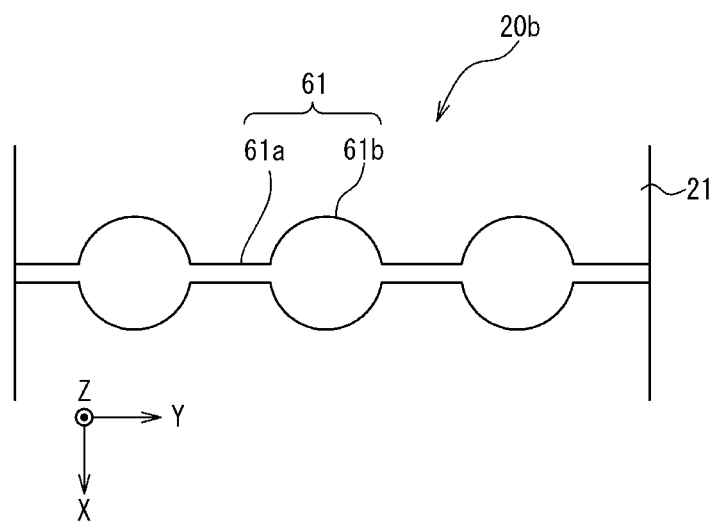
FIG. 10 is a plan view schematically showing another structural example of the fuel injector of the combustor according to the second embodiment.

Note that the change of width in a first direction (X direction) in the fuel injection port is not limited to an example of FIG. 9, and various modifications are possible. For example, FIG. 10 is a plan view schematically showing another structural example of the fuel injector of the combustor according to the present embodiment. In this modification example, a fuel injector 20b has a fuel injection port 61 as an opening from which the fuel is injected. The fuel injection port 61 extends in a second direction (Y direction) almost perpendicular to a first direction (X direction) of the air flow path, and the width in the first direction (X direction) changes along the second direction (Y direction). In an example of this figure, the fuel injection port 61 has an opening 61a with a narrow width in the first direction and an opening 61b with a wide width in the first direction. The change of the width in the first direction (X direction) is shaped like an arc in the opening 61b with the wide width and is shaped like a straight line in the opening 61a with the narrow width.

As for the present embodiment, when the local area of the opening of the fuel injection port is above the predetermined value and the flow speed of the fuel G in the injection is below the velocity of sound, the same effect as the first embodiment can be obtained.

By some embodiments, the jet engine, the flying object, and the method of operating the jet engine, in which it is possible to operate more stably can be provided. Also, by some embodiments, the jet engine, the flying object, and the method of operating the jet engine, in which the mixing of air and the fuel can be more promoted, can be provided.

This embodiment has been described by using an example where the jet engine is applied to the flying object. However, the present embodiment is not limited to the example, and it is possible to apply to a multi-stage launching machine or an aircraft which has the rocket and the jet engine.

It could be apparent that the present invention is not limited to each of the above embodiments and is appropriately changed or modified in a range of the technique thought of the present invention. Also, various techniques used in each embodiment or modification example can be applied to another example or modification example in a range with not technical contradiction.

This application is based on Japanese Patent Application No. 2014-70366 filed on Mar. 28, 2014 and claims the benefit of the priority of that application. The disclosure thereof is incorporated herein by reference.

The invention claimed is:

1. A jet engine comprising:
an inlet configured to take in air; and
a combustor configured to combust fuel by using the air;
wherein the combustor comprises:
an injector having an opening from which the fuel is injected,
wherein the opening is extended in a direction perpendicular to a direction of an air flow path in the combustor,
wherein the opening has a first part and a second part which are alternately arranged in the direction perpendicular to the direction of the air flow path, and
wherein a shortest width of the first part in the direction of the air flow path is shorter than a longest width of the second part in the direction of the air flow path.

2. The jet engine according to claim 1,
wherein a width, comprising the shortest width and the longest width of the opening in the direction of the air flow path is wavily changed along the direction perpendicular to the direction of the air flow path.

* * * * *